(12) United States Patent
Yamakawa

(10) Patent No.: US 10,852,992 B2
(45) Date of Patent: Dec. 1, 2020

(54) DATA MANAGEMENT SYSTEM, DATA MANAGEMENT METHOD, AND PROGRAM RECORDING MEDIUM

(71) Applicant: Mitsubishi Electric Corporation, Tokyo (JP)

(72) Inventor: Hiroaki Yamakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/957,732

(22) PCT Filed: Mar. 2, 2018

(86) PCT No.: PCT/JP2018/007989
§ 371 (c)(1),
(2) Date: Jun. 25, 2020

(87) PCT Pub. No.: WO2019/167246
PCT Pub. Date: Sep. 6, 2019

(65) Prior Publication Data
US 2020/0333986 A1 Oct. 22, 2020

(51) Int. Cl.
*G06F 3/06* (2006.01)
*G05B 19/05* (2006.01)

(52) U.S. Cl.
CPC ......... *G06F 3/0659* (2013.01); *G05B 19/056* (2013.01); *G06F 3/0604* (2013.01); *G06F 3/0683* (2013.01); *G05B 2219/15064* (2013.01)

(58) Field of Classification Search
CPC .... G06F 3/0659; G06F 3/0604; G06F 3/0683; G05B 19/056; G05B 2219/15064
(Continued)

(56) References Cited

U.S. PATENT DOCUMENTS 9,678,922 B2 * 6/2017 Osuga .................. G06F 15/167
10,048,912 B2 * 8/2018 Kawamori .......... G06F 11/3476
(Continued)

FOREIGN PATENT DOCUMENTS

JP      2-279458 A    11/1990
JP   2006-154944 A    6/2006
(Continued)

OTHER PUBLICATIONS

International Search Report and Written Opinion dated Apr. 17, 2018 for PCT/JP2018/007989 filed on Mar. 2, 2018, 12 pages including English Translation of the International Search Report.
(Continued)

*Primary Examiner* — Chun Cao
(74) *Attorney, Agent, or Firm* — Xsensus LLP

(57) ABSTRACT

A data management system includes: a plurality of controllers that each output control data updated by a data updating device that updates the control data and data related information to a network, the control data being data necessary for controlling a device to be controlled, the data related information being information related to the updated control data and including at least date and time information being information on a date and time when the control data are updated; and a data management device that is connected with the plurality of controllers via the network, acquires the control data and the data related information output from each of the controllers, and accumulates the control data and the data related information in association with each other.

13 Claims, 8 Drawing Sheets

(58) Field of Classification Search
USPC .......................................................... 700/87
See application file for complete search history.

(56) References Cited

U.S. PATENT DOCUMENTS

| | | | | |
|---|---|---|---|---|
| 10,162,328 | B2* | 12/2018 | Takeuchi | ............ G05B 19/056 |
| 2015/0186119 | A1* | 7/2015 | Chouinard | ............... G06F 8/34 |
| | | | | 717/113 |
| 2016/0132270 | A1* | 5/2016 | Miki | .................... G06F 3/0643 |
| | | | | 711/170 |
| 2016/0154399 | A1* | 6/2016 | Mochida | ................ G05B 19/41 |
| | | | | 700/189 |
| 2016/0370781 | A1 | 12/2016 | Kudo et al. | |
| 2017/0168764 | A1 | 6/2017 | Kawamori | |
| 2018/0005195 | A1* | 1/2018 | Jacobson | ............ H04L 12/2816 |

FOREIGN PATENT DOCUMENTS

| | | |
|---|---|---|
| JP | 2016-99899 A | 5/2016 |
| JP | 6054008 B1 | 12/2016 |
| JP | 2017-10159 A | 1/2017 |
| JP | 2017-107357 A | 6/2017 |
| WO | 2015/136970 A1 | 9/2015 |

OTHER PUBLICATIONS

Notification of Reasons for Refusal received for Japanese Patent Application No. 2018-537561, dated Oct. 9, 2018, 10 pages including English Translation.

Notification of Reasons for Refusal received for Japanese Patent Application No. 2018-537561, dated Feb. 5, 2019, 4 pages including English Translation.

Decision to Grant a Patent received for Japanese Patent Application No. 2018-537561, dated Apr. 16, 2019, 5 pages including English Translation.

* cited by examiner

FIG.9

| IDENTIFICATION NUMBER | TAG | UPDATE DATE AND TIME |
|---|---|---|
| 1 | TAG A | 2017/7/21 16:00 |
| 2 | TAG B | 2017/7/22 23:00 |
| 3 | TAG C | 2017/7/23 20:00 |
| ... | ... | ... |

UPDATE DATA SELECTION

IDENTIFICATION NUMBER

UPDATE EXECUTION

CANCEL

DATA MANAGEMENT SYSTEM, DATA MANAGEMENT METHOD, AND PROGRAM RECORDING MEDIUM

CROSS-REFERENCE TO RELATED APPLICATION

The present application is based on PCT filing PCT/JP2018/007989, filed Mar. 2, 2018, the entire contents of which are incorporated herein by reference.

FIELD

The present invention relates to a data management system, a controllers, a data management device, a data management method, and a data management program for managing data written into programmable logic controllers (hereinafter referred to as "PLCs").

BACKGROUND

A PLC used as a controller of an industrial machine or the like receives data such as programs and set values written by external devices such as an engineering tool, and controls the industrial machine to be controlled in accordance with the written data.

Data written in a PLC may be partly or entirely rewritten for some reason.

Patent Literature 1 describes an invention for keeping programs executed by a plurality of PLCs in the same state as each other in a system including the PLCs.

CITATION LIST

Patent Literature

Patent Literature 1: Japanese Patent Application Laid-open No. 2016-99899

SUMMARY

Technical Problem

At a production site such as a factory, a production system including a plurality of PLCs connected with each other for controlling an industrial machine by cooperation of the PLCs is often introduced. In this case, data written in the respective PLCs included in one production system need to be managed together.

With the invention described in Patent Literature 1, however, although one program can be written in all of the PLCs when managing programs being written in the respective PLCs and updating the programs to be executed by the PLCs, there has been a problem in that data written in the plurality of PLCs cannot be collectively managed.

The present invention has been made in view of the above, and an object thereof is to provide a data management system capable of collectively managing data written in each of the plurality of PLC included in one system.

Solution to Problem

To solve the aforementioned problems and achieve the object, a data management system according to the present invention includes a plurality of controllers. Each of the plurality of controller outputs: control data updated by a data updating device; and data related information, to a network. The control data is data necessary for controlling a device to be controlled, and the data related information is information related to the updated control data and includes at least date-and-time information that is information on a date-and-time when the control data are updated. The data management system also includes a data management device that: is connected with the plurality of controllers via the network; acquires the control data and the data related information output from each of the plurality of controller; and accumulates the control data and the data related information in association with each other.

Advantageous Effects of Invention

A data management system according to the present invention produces an effect of collectively managing data written in each of the plurality of PLC that constitutes one system.

BRIEF DESCRIPTION OF DRAWINGS

FIG. 9 is a diagram illustrating an example of an update data selection screen displayed on the display of the data management device according to the embodiment.

DESCRIPTION OF EMBODIMENTS

A data management system, a controller, a data management device, a data management method, and a data management program according to an embodiment of the present invention will now be described in detail with reference to the drawings. Note that the present invention is not limited to the embodiment.

Embodiment

Figure 1:
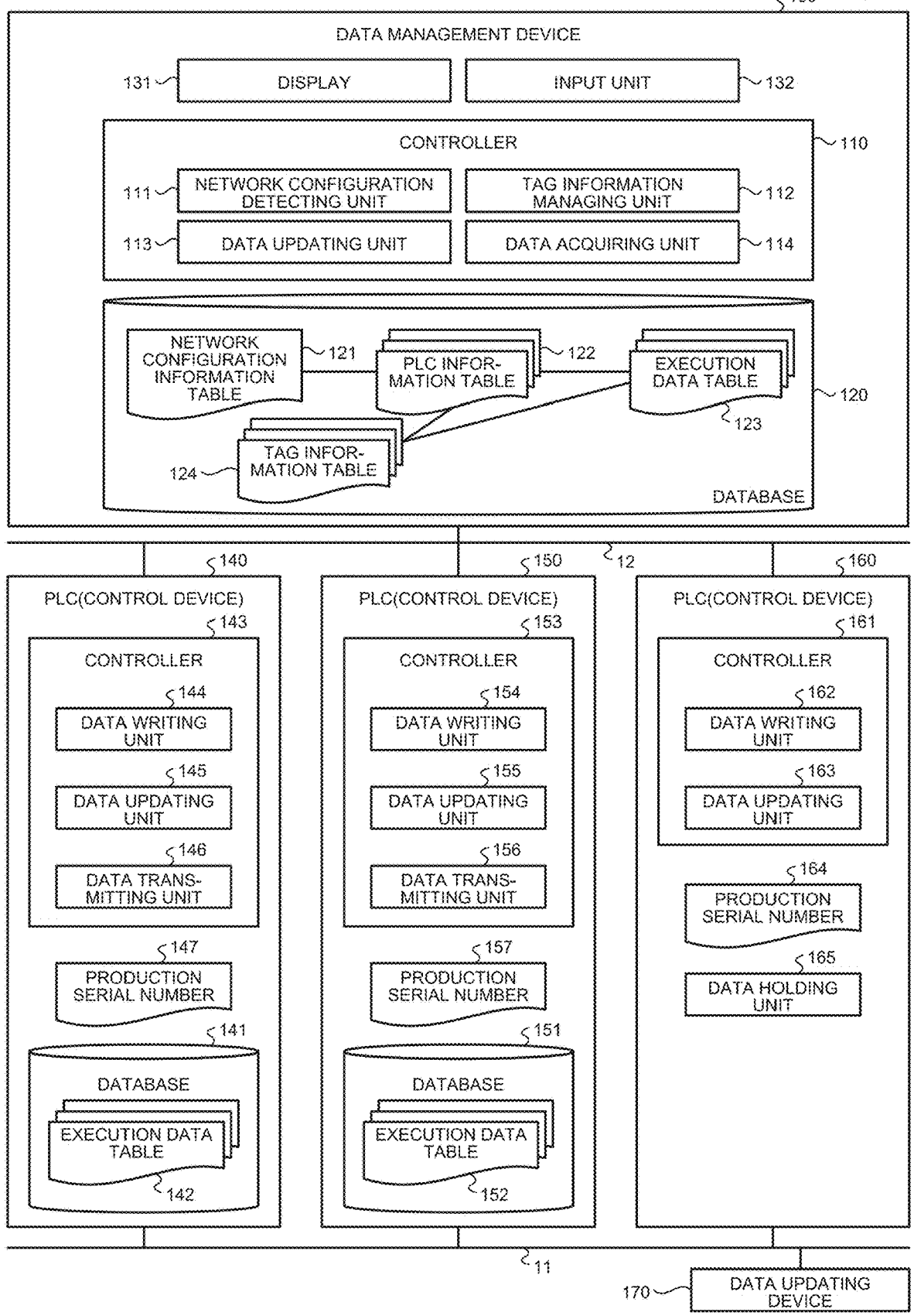
FIG. 1 is a diagram illustrating an example of a configuration of a data management system according to an embodiment.

FIG. 1 is a diagram illustrating an example of a configuration of a data management system according to an embodiment of the present invention. A data management system 1 includes a data management device 100, PLCs 140, 150, and 160, which are controllers, and a data updating device 170.

The PLCs 140, 150, and 160 are connected with the data updating device 170 via a network 11, which is a first network, and with the data management device 100 via a network 12, which is a second network. Note that the number of PLCs included in the data management system 1 is not limited to three. The number of PLCs may be two or four or larger. While the data management device 100 and the data updating device 170 are connected to networks different from each other in the example illustrated in FIG. 1, the data management device 100 and the data updating device 170 may be connected to a network in common. In addition, the data management device 100 and the PLCs may be connected with each other via radio communication. Similarly, the PLCs and the data updating device 170 may be connected with each other via radio communication.

The data management device 100 manages data written into each of a plurality of PLCs 140, 150, and 160.

Upon receiving data from the data management device 100 or the data updating device 170, the PLCs 140, 150, and 160 hold the data, and controls devices to be controlled, which are not illustrated, in accordance with the held data.

The data updating device 170 generates and modifies various data to be written into the PLCs 140, 150, and 160. Data generated by the data updating device 170 include control data. Control data are data necessary for the PLCs 140, 150, and 160 to control devices to be controlled. Examples of control data include control programs and set values. Set values are set values of control parameters referred to by PLCs when executing control programs. Even when the control programs executed by PLCs are identical, the operations of the PLCs vary by changing the set values. Examples of control parameters include the number of repetitions of a process, and a threshold to be used for operation error determination.

The data management device 100 includes a controller 110, a database 120, a display 131, and an input unit 132.

The controller 110 includes a network configuration detector 111, a tag information managing unit 112, a data updating unit 113, and a data acquiring unit 114.

The network configuration detector 111 detects the PLC 140, the PLC 150, and the PLC 160 connected with the network 12. The network configuration detector 111 performs the detection by attempting to communicate with PLCs belonging to a network address identical to the network address of an IP address assigned to the data management device 100. For example, the network configuration detector 111 broadcasts a packet for connection detection into the network 12 every predetermined time, and determines that a PLC is connected when a response therefrom is returned. The network configuration detector 111 writes information about a detected configuration, that is, information about the PLC connected with the network 12 into a network configuration information table 121 in the database 120. The network configuration detector 111 also has a function of detecting connection of the data management device 100 with a network. Upon detecting that the data management device 100 is connected with a network, the network configuration detector 111 performs a process of detecting PLCs connected with the network with which the connection is detected.

The tag information managing unit 112 gives a name (hereinafter referred to as a tag) for managing the state of control data on a specific date and time to the control data written in a PLC, and writes the given tag into a tag information table 124 in the database 120. The tag information managing unit 112 also has a function of, when a tag is specified and write-back of data is instructed by a user, reading data to which the specified tag is given from the database 120 and writing the data back into a PLC.

The data updating unit 113 updates execution data of the PLCs 140, 150, and 160 connected via the network 12.

The data acquiring unit 114 acquires data for management in the database 120 from the PLCs 140, 150, and 160 connected via the network 12. The data acquiring unit 114 writes data acquired from the PLCs into the database 120.

Figure 2:
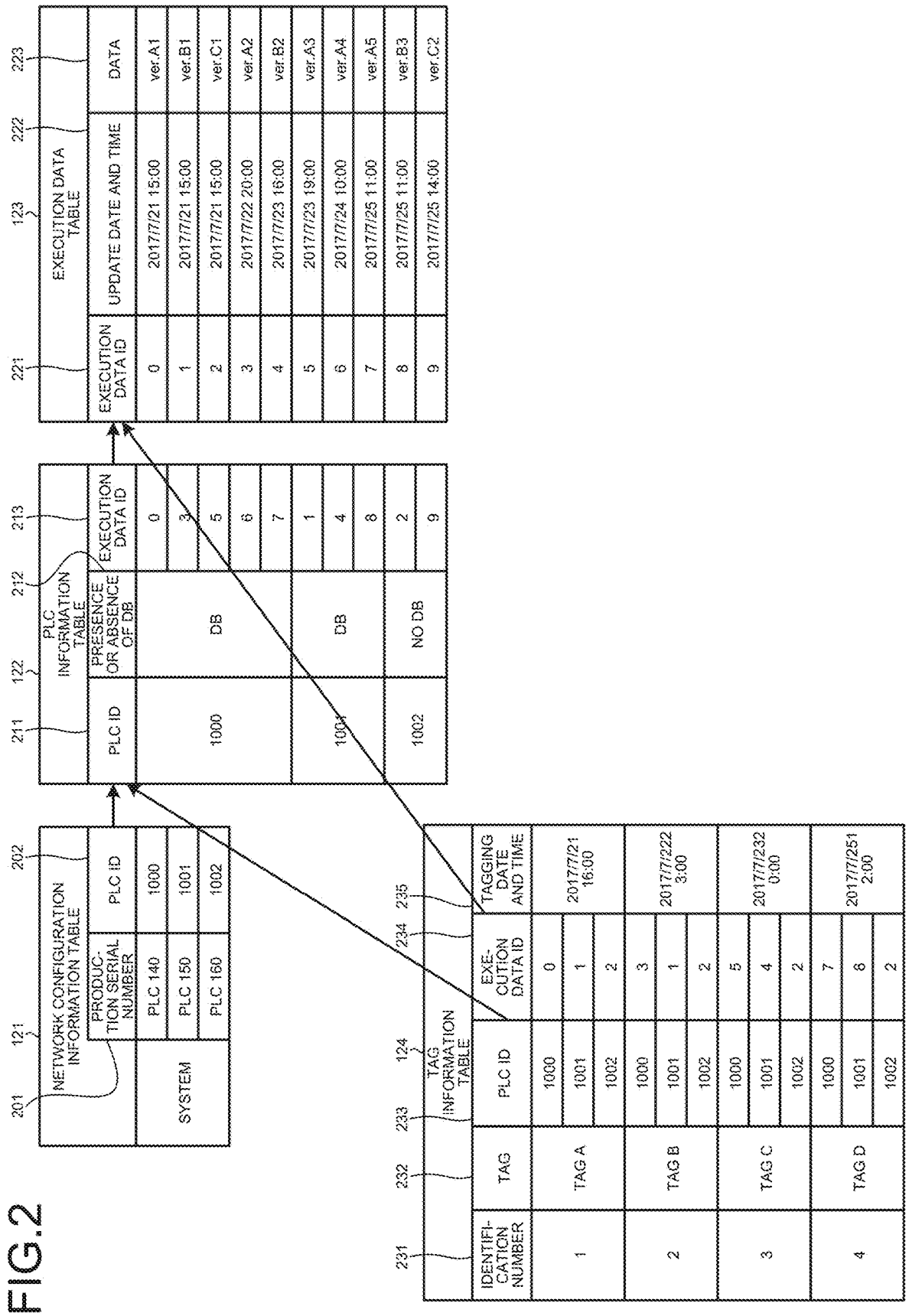
FIG. 2 is a diagram illustrating an example of a configuration of a database included in a data management device according to the embodiment.

The database 120 includes the network configuration information table 121, a PLC information table 122, an execution data table 123, and the tag information table 124. The database 120 is a management device storage that stores various information in the data management device. The execution data table 123 includes data actually written in each PLC and being currently used, and previously used data. A configuration of the database 120 will be described with reference to FIG. 2. FIG. 2 is a diagram illustrating an example of a configuration of the database 120 included in the data management device according to the embodiment.

The network configuration information table 121 held in the database 120 records information representing a configuration detected by the network configuration detector 111. Specifically, the network configuration information table 121 holds production serial numbers 201 as information for uniquely identifying PLCs detected by the network configuration detector 111. When the network configuration detector 111 has detected a PLC, the production serial number 201 is acquired from the detected PLC and registered in the network configuration information table 121. Note that the production serial numbers 201 are also rewritable by user operation, and when a PLC is replaced, the PLC after the replacement can be associated with data registered in each of the PLC information table 122 and the execution data table 123.

The network configuration information table 121 also records PLC IDs 202. The PLC ID 202 is given to the production serial number 201 to associate the production serial number 201 registered in the network configuration information table 121 with data registered in the PLC information table 122. The PLC IDs 202 are universally unique identifiers (hereinafter referred to as UUIDs). Thus, each of the IDs given as PLC IDs 202 to respective production serial numbers registered as the production serial numbers 201 is managed so as not to overlap with the other IDs. Note that, because the production serial numbers are normally different for different PLCs, there is no problem in using production serial numbers instead of PLC IDs.

The PLC information table 122 records PLC IDs 211, a presence or absence of a database (DB) 212, and execution data IDs 213. The presence or absence of a DB 212 is information indicating whether a PLC holds a database. A database held by a PLC is a database in which data previously written in the PLC and used and data being currently used are recorded. The presence or absence of a DB 212 is used for determination on whether to use the database in a PLC or the database 120 managed by the data management device 100 when the data management device 100 performs data update on the PLC.

An execution data ID 213 is an ID representing one of a plurality of data registered in the execution data table 123, and corresponds to data identification information. Each of the IDs recorded as the execution data IDs 213 is an UUID that does not overlap with the other IDs.

The execution data table 123 records execution data IDs 221, update dates and times 222, and data 223. The execution data IDs 221 are the same as the execution data IDs 213 described above. The data 223 recorded in the execution data table 123 are associated with data registered in the PLC information table 122 and the tag information table 124 by the execution data IDs 221. The data 223 are data actually written in each PLC and being currently used, and previously used data. Which data are written and into which PLC the data are written can be known by reference to the PLC information table 122. Update date and time 222 indicates the date and time when data 223 are written into a PLC. Note that "ver.A1", "ver.A2", "ver.A3", "ver.A4", and "ver.A5" in the data 223 are data previously used or data being currently used in the PLC 140 with a PLC ID=1000. "ver.B1", "ver.B2", and "ver.B3" are data previously used or data being currently used in the PLC 150 with a PLC ID=1001. "ver.C1" and "ver.C2" are data used or data being currently used in the PLC 160 with a PLC ID=1002.

The tag information table 124 records identification numbers 231, tags 232, PLC IDs 233, execution data IDs 234, and tagging dates and times 235. The PLC IDs 233 are the same as the PLC IDs 202 and 211 described above. The execution data IDs 234 are the same as the execution data IDs 213 and 221 described above. The identification number 231 is an identification number of a tag. A tag 232 is a name given to data written in the PLCs (PLCs 140, 150, and 160) at a time point. Tagging date and time 235 is the date and the time when a tag is attached. The example illustrated in FIG. 2 shows that "tag A" represents: data having been written in each of the PLC by 16:00 on 2017 Jul. 21; data with an execution data ID "0" have been written into the PLC with the PLC ID "1000"; data with an execution data ID "1" have been written into the PLC with the PLC ID "1001"; and data with an execution data ID "2" have been written into the PLC with the PLC ID "1002". Thus, it is shown that: data named "ver.A1" have been written into the PLC with the PLC ID "1000"; data named "ver.B1" have been written into the PLC with the PLC ID "1001"; and data named "ver.C1" have been written into the PLC with the PLC ID "1002" by 16:00 on 2017 Jul. 21. The tag 232 corresponds to update history identification information that is information for identifying history of data update.

The display 131 displays various screens necessary for a user to operate the data management device 100, such as a screen for checking various information held in the database 120, and a screen for specifying data to be written into a PLC.

The input unit 132 is a user operation receiver that receives operations made by a user on the data management device 100.

Figure 3:
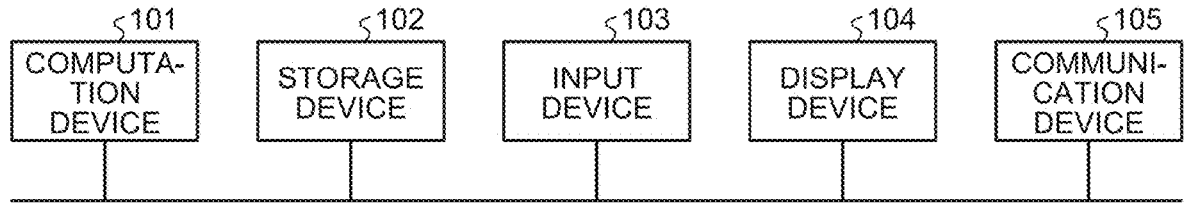
FIG. 3 is a diagram illustrating an example of hardware for implementing the data management device according to the embodiment.

FIG. 3 is a diagram illustrating an example of hardware for implementing the data management device 100 according to the embodiment. The data management device 100 can be implemented by a computer including a computation device 101, a storage device 102, an input device 103, a display device 104, and a communication device 105 illustrated in FIG. 3.

A central processing unit (CPU) can be applied to the computation device 101, and a random access memory (RAN) and a read only memory (ROM) can be applied to the storage device 102. In addition, a mouse, a keyboard, a touch panel, or the like can be applied to the input device 103, and a liquid crystal monitor, a display, or the like can be applied to the display device 104. A network interface card can be applied to the communication device 105.

The network configuration detector 111, the tag information managing unit 112, the data updating unit 113, and the data acquiring unit 114 of the data management device 100 are implemented by the computation device 101 by executing programs for operating above described units. Programs for operations as the network configuration detector 111, the tag information managing unit 112, the data updating unit 113, and the data acquiring unit 114 are stored in advance in the storage device 102. The computation device 101 reads the programs from the storage device 102 and executes the programs to operate as the network configuration detector 111, the tag information managing unit 112, the data updating unit 113, and the data acquiring unit 114.

The database 120 is implemented by the storage device 102. In addition, the display 131 is implemented by the display device 104, and the input unit 132 is implemented by the input device 103. Note that the communication device 105 illustrated in FIG. 3 is used by the data management device 100 to communicate with each of the PLC.

The PLC 140 includes a database 141 and a controller 143. In addition, the PLC 140 holds a production serial number 147 that is a number for uniquely identifying the PLC 140.

The database 141 holds an execution data table 142. The data components of the execution data table 142 are similar to the data components in the execution data table 123 held by the database 120 of the data management device 100. Specifically, the execution data table 142 includes execution data IDs, update dates and times, and data. The database 141, however only holds data written in the PLC 140 and used, but does not hold data written in the other PLCs and used. The database 141 is a controller storage that stores various information in the PLC 140, which is a controller.

The controller 143 includes a data writing unit 144, a data updating unit 145, and a data transmitting unit 146.

Upon receiving data from the data updating device 170, the data writing unit 144 writes the received data into the database 141 to update the execution data table 142, and transmits the received data to the data management device 100. Note that, upon receiving the data from the PLC 140, the data management device 100 writes the received data into the execution data table 123 to update the database 120.

Upon receiving a data updating instruction or a data writing instruction from the data management device 100, the data updating unit 145 updates the execution data to be used by the PLC 140 to control a device to be controlled. Although details will be described later, upon receiving a data updating instruction from the data management device 100, due to an execution data ID is specified by the data updating instruction, the data updating unit 145 changes the setting of the PLC 140 so that the PLC 140 controls the device to be controlled by using data associated with the specified execution data ID among data registered in the execution data table 142. In addition, when no data associated with the execution data ID specified in the data updating instruction are present, the data updating unit 145 returns an error to the data management device 100. Upon receiving a data writing instruction from the data management device 100, the data updating unit 145 changes the setting of the PLC 140 so that the PLC 140 controls the device to be controlled by using execution data included in the data writing instruction. When changing the execution data to be used for control of the device to be controlled upon receiving a data updating instruction or a data writing instruction, the data updating unit 145 also updates the database 141. Specifically, the data updating unit 145 registers the execution data ID, the update date and time, and the data to be used in the execution data table 142 in the database 141.

Upon receiving an execution data acquiring instruction from the data management device 100, the data transmitting unit 146 reads data registered in the execution data table 142 from the database 141, and transmits the read data to the data management device 100.

The PLC 140 can be implemented by the computation device 101, the storage device 102, the input device 103, the display device 104, and the communication device 105 illustrated in FIG. 3 similarly to the data management device 100.

The data writing unit 144, the data updating unit 145, and the data transmitting unit 146 are implemented by the computation device 101 by executing programs for operating these units. The database 141 is implemented by the storage device 102.

The PLC 150 includes a database 151 and a controller 153. In addition, the PLC 150 holds a production serial number 157 that is a number for uniquely identifying the PLC 150. The database 151 is a database similar to the database 141 included in the PLC 140. The controller 153 includes a data writing unit 154, a data updating unit 155, and a data transmitting unit 156. Processes performed by these units are similar to processes performed by the data writing unit 144, the data updating unit 145, and the data transmitting unit 146 of the PLC 140.

The PLC 160 includes a controller 161 and a data holding unit 165, and the controller 161 includes a data writing unit 162 and a data updating unit 163. The data holding unit 165 holds various data necessary for the PLC 160 to operate. Examples of data held by the data holding unit 165 include control programs and set values. In addition, the PLC 160 holds a production serial number 164 that is a number for uniquely identifying the PLC 160.

The PLC 160 is a PLC including no database. Thus, the controller 161 includes no data transmitting unit. Upon receiving data from the data updating device 170, the data writing unit 162 overwrites data in the data holding unit 165 with the received data, and transmits the received data to the data management device 100. Upon receiving a data writing instruction from the data management device 100, the data updating unit 163 overwrites data in the data holding unit 165 with execution data transmitted with the data writing instruction.

Note that the PLC 150 and the PLC 160 can be implemented by the computation device 101, the storage device 102, the input device 103, the display device 104, and the communication device 105 illustrated in FIG. 3 similarly to the PLC 140 and the data management device 100.

Next, operation of the data management system 1 will be described. Herein, operations of the PLC 140, the PLC 150, the PLC 160 and the data management device 100 when the data updating device 170 writes data into each of the PLC, operation of the data management device 100 for acquiring data from each of the PLC when connected with a network with which the PLCs are connected, operation of the data management device 100 for attaching a tag to data held in the database 120, and operation of the data management device 100 for updating data written in each of the PLC will be explained with reference to the drawings.

Figure 4:
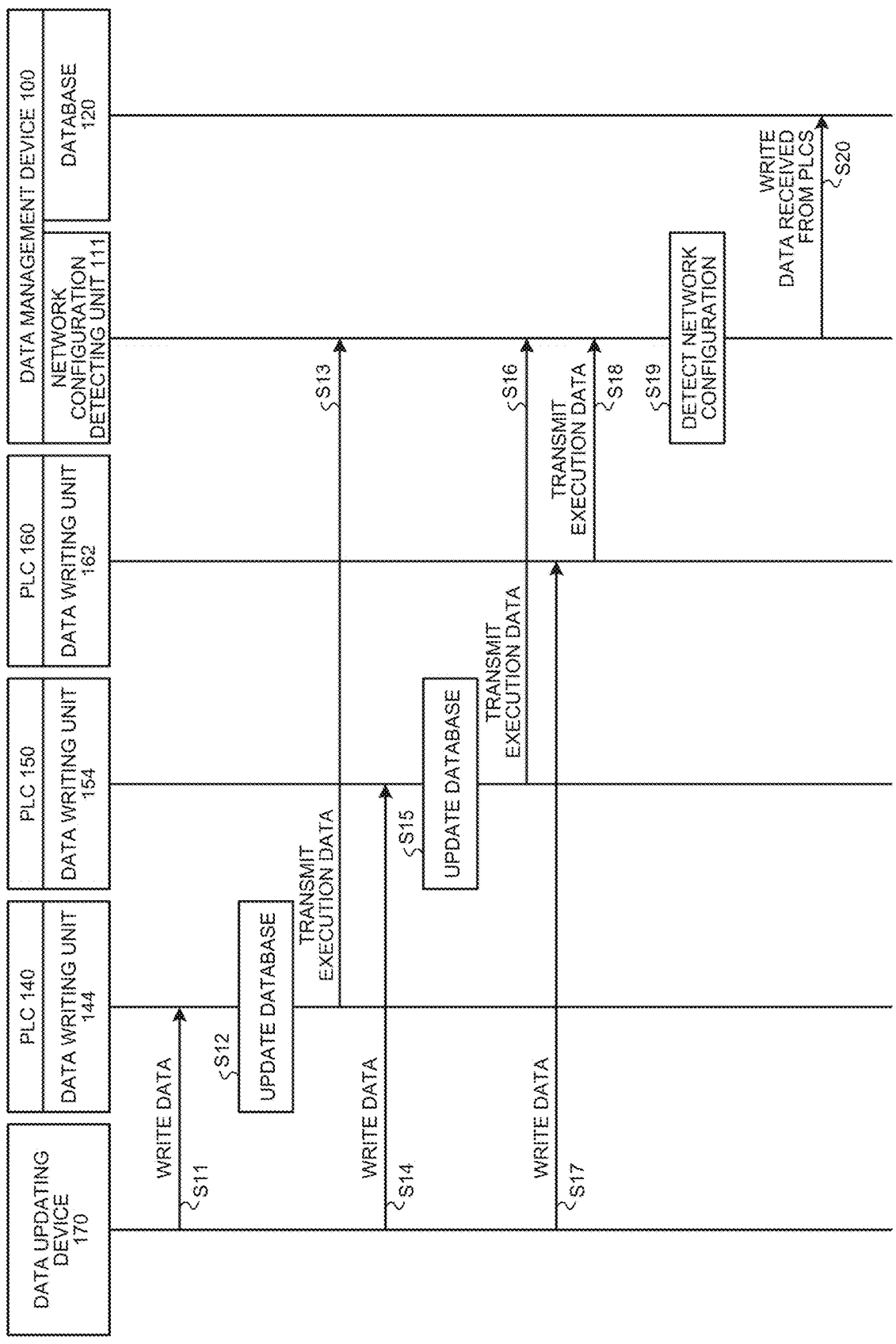
FIG. 4 is a sequence diagram illustrating an example of operations of PLCs and the data management device when a data updating device writes execution data into each of the PLC according to the embodiment.

FIG. 4 is a sequence diagram illustrating an example of operations of the PLCs and the data management device 100 when the data updating device 170 writes execution data in the PLC 140, the PLC 150, and the PLC 160 according to the embodiment.

In the example illustrated in FIG. 4, the data updating device 170 first writes data into the PLC 140 (step S1). Specifically, the data updating device 170 transmits a data writing instruction and data to be written to the PLC 140. Assume that an execution data ID is given to the data transmitted by the data updating device 170. In the PLC 140 in receipt of the data from the data updating device 170, the data writing unit 144 writes the received data (the data given the execution data ID) into the execution data table 142 to update the database 141 (step S12). In this process, the data writing unit 144 writes information on the date and time of update of the database 141 into the execution data table 142. The data writing unit 144 further transmits the execution data written into the execution data table 142, that is, the execution data ID, the update date and time, and the data to the data management device 100 (step S13). The execution data ID and the update date and time are data related information relating to the updated data. Assume that, when transmitting the execution data to the data management device 100, the data writing unit 144 also transmits the production serial number of the PLC 140 and information on whether or not the PLC 140 includes a database. The production serial number is controller identification information. The information on whether or not a database is included is storage presence/absence information. Information that is combination of a production serial number and information on whether or not a database is included is controller information relating to a controller.

Subsequently, the data updating device 170 writes data into the PLC 150 (step S14). Specifically, the data updating device 170 transmits a data writing instruction and data to be written to the PLC 150. The data writing unit 154 of the PLC 150 in receipt of the data from the data updating device 170 writes the received data into the execution data table 152 to update the database 151 (step S15). In this process, the data writing unit 154 writes information on the date and time of update of the database 151 into the execution data table 152. The data writing unit 154 further transmits the execution data written into the execution data table 152, that is, the execution data ID, the update date and time, and the data to the data management device 100 (step S16). Assume that, when transmitting the execution data to the data management device 100, the data writing unit 154 also transmits information on the production serial number of the PLC 150 and information on whether or not the PLC 150 includes a database.

Subsequently, the data updating device 170 writes data into the PLC 160 (step S17). Specifically, the data updating device 170 transmits a data writing instruction and data to be written to the PLC 160. The data writing unit 162 of the PLC 160 in receipt of the data from the data updating device 170 writes the received data into the data holding unit 165, and further transmits the received data (the data given the execution data ID) and the date and time of update of the data holding unit 165 as execution data to the data management device 100 (step S18) Assume that, when transmitting the execution data to the data management device 100, the data writing unit 162 also transmits information on the production serial number of the PLC 160 and information on whether or not the PLC 160 includes a database. Because the PLC 160 includes no database, the data writing unit 162 does not perform a process of updating a database.

When the execution data and the information on the production serial number are transmitted from the PLCs 140, 150, and 160, the network configuration detector 111 of the data management device 100 detects the network configuration, that is, the PLCs connected with the network 12 (step S19). Herein, the network configuration detector 111 detects that the PLCs 140, 150, and 160 are connected with the network 12. The network configuration detector 111 then writes the data received from the PLCs into the database 120 to update the database 120 (step S20). Specifically, the network configuration detector 111 writes the data received from the PLCs into the network configuration information table 121, the PLC information table 122, and the execution data table 123.

While the data management device 100 detects the network configuration and updates the database 120 after receiving the execution data from all the PLCs in the example illustrated in FIG. 4, the data management device 100 may detect the network configuration and update the database 120 every time the data management device 100 receives execution data from one PLC.

Figure 5:
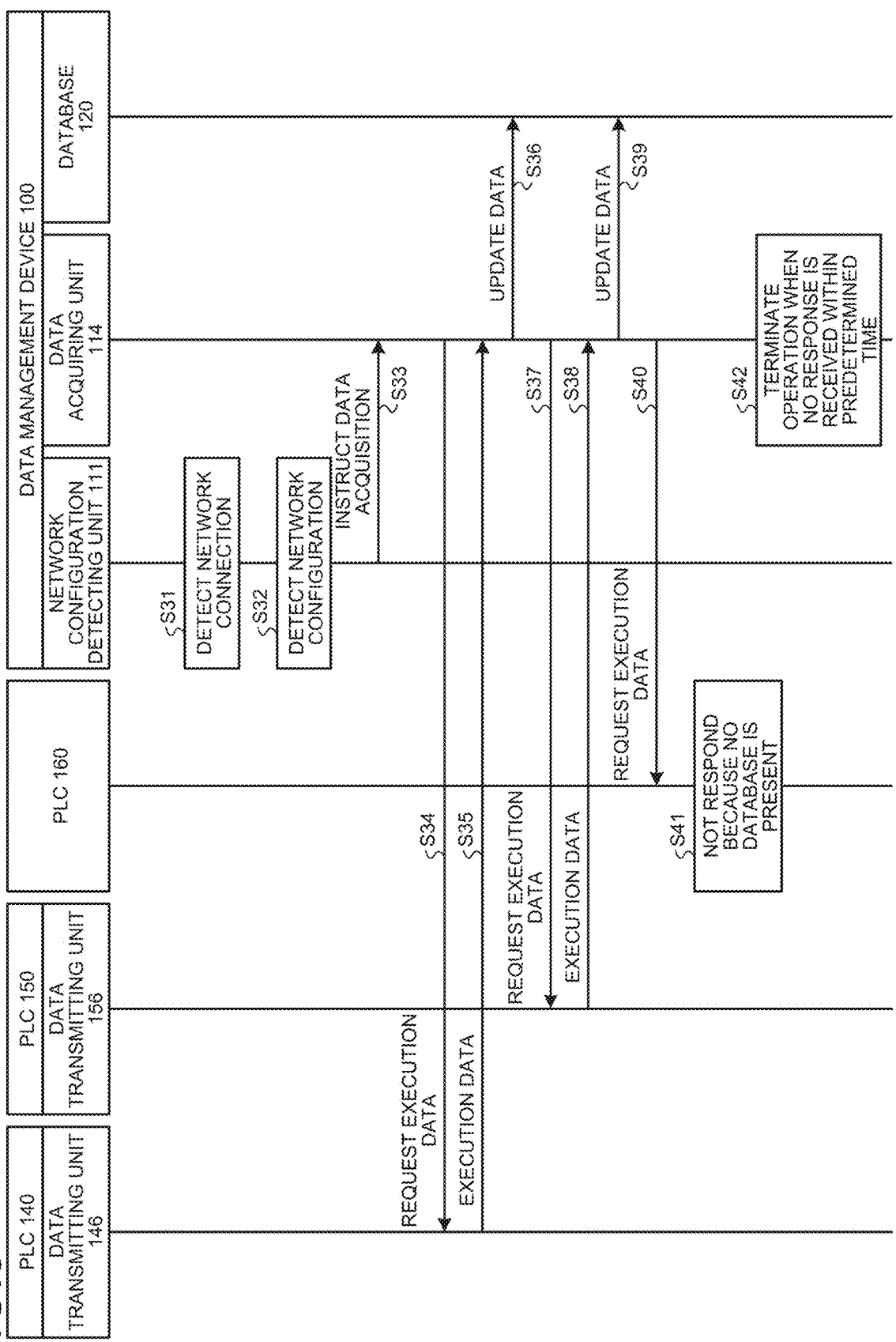
FIG. 5 is a sequence diagram illustrating an example of operation of the data management device for acquiring data from each of the PLC when the data management device is connected with a network according to the embodiment.

FIG. 5 is a sequence diagram illustrating an example of operation of the data management device 100 for acquiring data from each of the PLC when the data management device 100 according to the embodiment is connected with a network.

Upon detecting that the data management device 100 is connected with a network (step S31), the network configuration detector 111 of the data management device 100 detects the network configuration, that is, PLCs connected with the network with which the data management device 100 is connected (step S32). Upon detecting the network configuration, the network configuration detector 111 instructs the data acquiring unit 114 to acquire data (step S33). In this process, the network configuration detector 111 informs the data acquiring unit 114 of detected PLCs. In the example illustrated in FIG. 5, the network configuration detector 111 detects the PLCs 140, 150, and 160, and informs the data acquiring unit 114 of the detected PLCs.

The data acquiring unit 114 instructed to acquire data transmits a data output request to the PLCs 140, 150, and 160 to request output of execution data (steps S34, S37, and S40).

The PLCs 140 and 150 among the PLCs requested to output execution data each include a database, and thus transmit execution data stored in the database to the data management device 100 (steps S35 and S38). Note that the data transmitting unit 146 in the PLC 140 transmits execution data, and the data transmitting unit 156 in the PLC 150 transmits data. In addition, the data transmitting units 146 and 156 transmit all the data written in the execution data tables to the data management device 100. Specifically, the data transmitting unit 146 transmits all the data written in the execution data table 142 in the database 141. The data transmitting unit 156 transmits all the data written in the execution data table 152 in the database 151. The data transmitting units 146 and 156 also transmit the execution data IDs and the production serial numbers of the PLCs when transmitting the execution data.

Among the PLCs requested to output execution data, the PLC 160 includes no database, and thus does not respond (step S41).

When the data acquiring unit 114 of the data management device 100 receives execution data from the PLCs, the data acquiring unit 114 writes the received execution data, the execution data IDs and the production serial numbers into the database 120 to update the database 120 (steps S36 and S39). In addition, the data acquiring unit 114 terminates the operation when no response is received by a predetermined time elapses after the request to the PLCs to output execution data (step S42).

Figure 6:
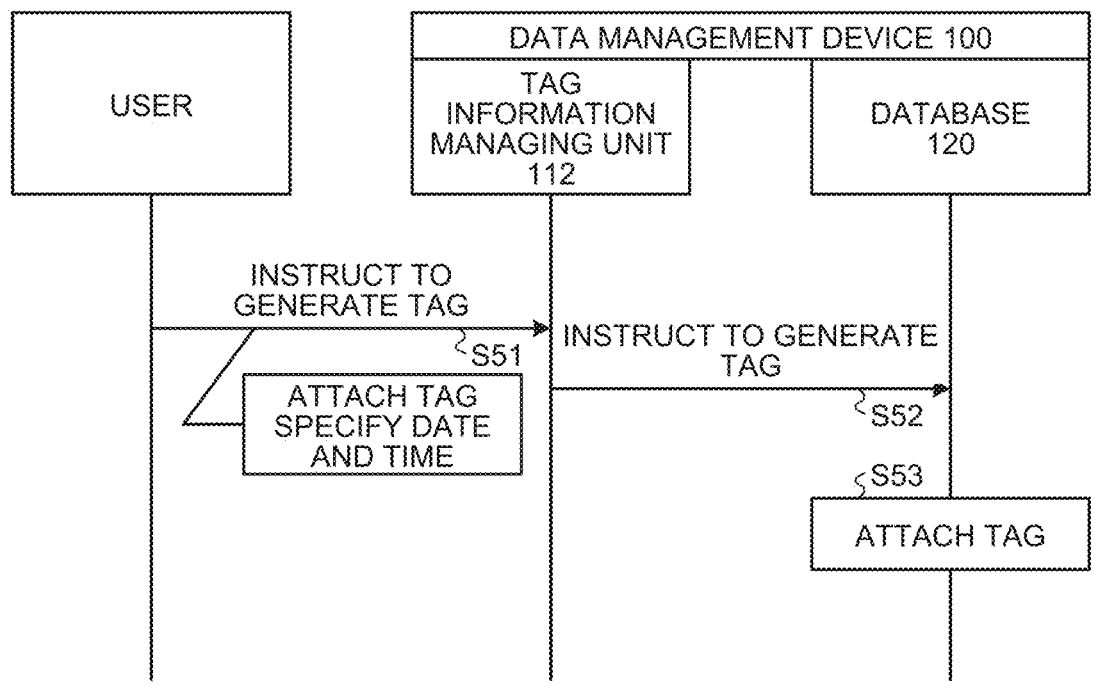
FIG. 6 is a sequence diagram illustrating an example of operation of the data management device for attaching a tag to data held in a database according to the embodiment.

FIG. 6 is a sequence diagram illustrating an example of operation of the data management device 100 for attaching a tag to data held in the database 120 according to the embodiment.

Figure 7:
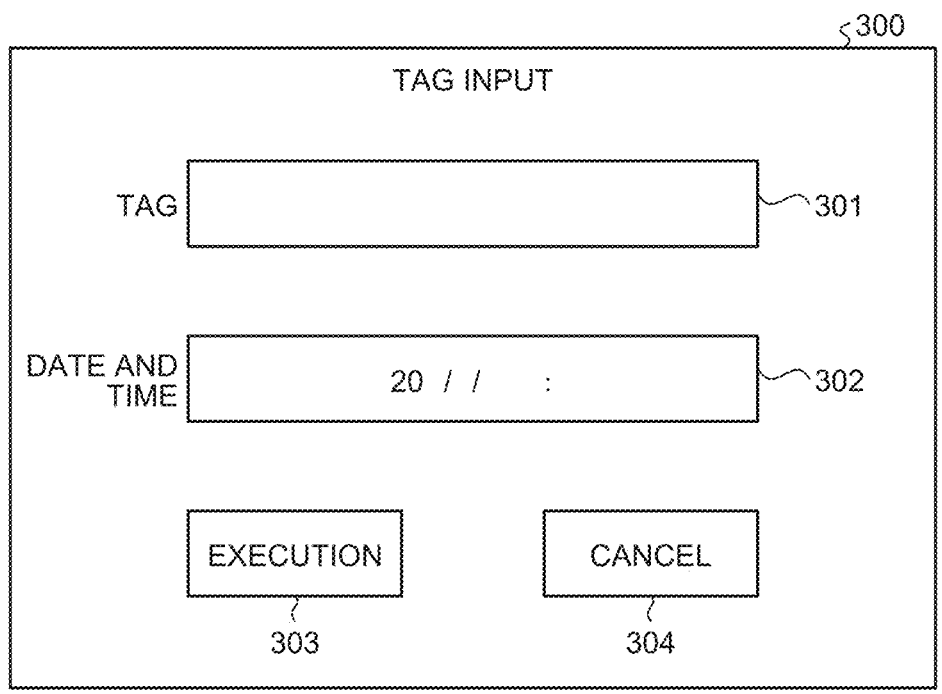
FIG. 7 is a diagram illustrating an example of a tag information input screen displayed on a display of the data management device according to the embodiment.

The operation illustrated in FIG. 6 is started when a user has made operation for instruction to generate a tag, that is specifically, when a user has input a tag to be attached to data and the date and time when the tag is to be attached. For example, the user performs a predetermined operation by using the input unit 132 of the data management device 100 to cause the display 131 to display an input screen 300 illustrated in FIG. 7 as an example. FIG. 7 is a diagram illustrating an example of a tag information input screen displayed on the display 131 of the data management device 100 according to the embodiment. The input screen 300 includes a field 301 for inputting a tag and a field 302 for inputting a date and time. After inputting a tag and a date and time in the fields 301 and 302, respectively, the user operates an execution button 303 for instruction to generate a tag (step S51). Note that the operation is terminated when a cancel button 304 is operated. In addition, operation of the execution button 303 in a state in which a future date and time from the current time is input is invalid. In a state in which the input screen 300 is displayed on the display 131, the input unit 132 operates as a tag input receiver. While the user directly operates the data management device 100 to input necessary information and the like herein, a user typically inputs necessary information and the like by using an external device such as an engineering tool connected with the data management device 100 via a network. A user may directly operate the data management device 100 to input necessary information and the like, or may operate an external device such as an engineering tool to input necessary information and the like.

Upon detecting operation for instruction to generate a tag, the tag information managing unit 112 of the data management device 100 instructs the database 120 to generate a tag (step S52). In this process, the tag information managing unit 112 informs the database 120 of the tag and the information on the date and time input by the user. The database 120 attaches the tag in accordance with the information as informed (step S53). In step S53, the database 120 first registers the tag input by the user in a tag 232 of the tag information table 124 (see FIG. 2) The database 120 subsequently identifies data written in each of the PLCs at the time point indicated by the specified date and time that is the date and time input by the user on the basis of: the specified date and time; the information registered in the PLC information table 122; and the information registered in the execution data table 123. The database 120 then registers execution data IDs representing the identified data in the tag information table 124.

For example, when the tag is "tag E" and the specified date and time is "2017/7/25 10:00", the database 120 registers "tag E" in the tag 232 anew. In addition because data with an execution data ID "6" are the latest at the time point of the specified date and time, the database 120 identifies that data with "execution data ID=6" are written in the PLC 140 with "PLC ID=1000", data with "execution data ID=4" are written in the PLC 150 with "PLC ID=1001", and data with "execution data ID=2" are written in the PLC 160 with "PLC ID=1002". The database 120 then registers the identified execution data IDs in the tag information table 124.

Figure 8:
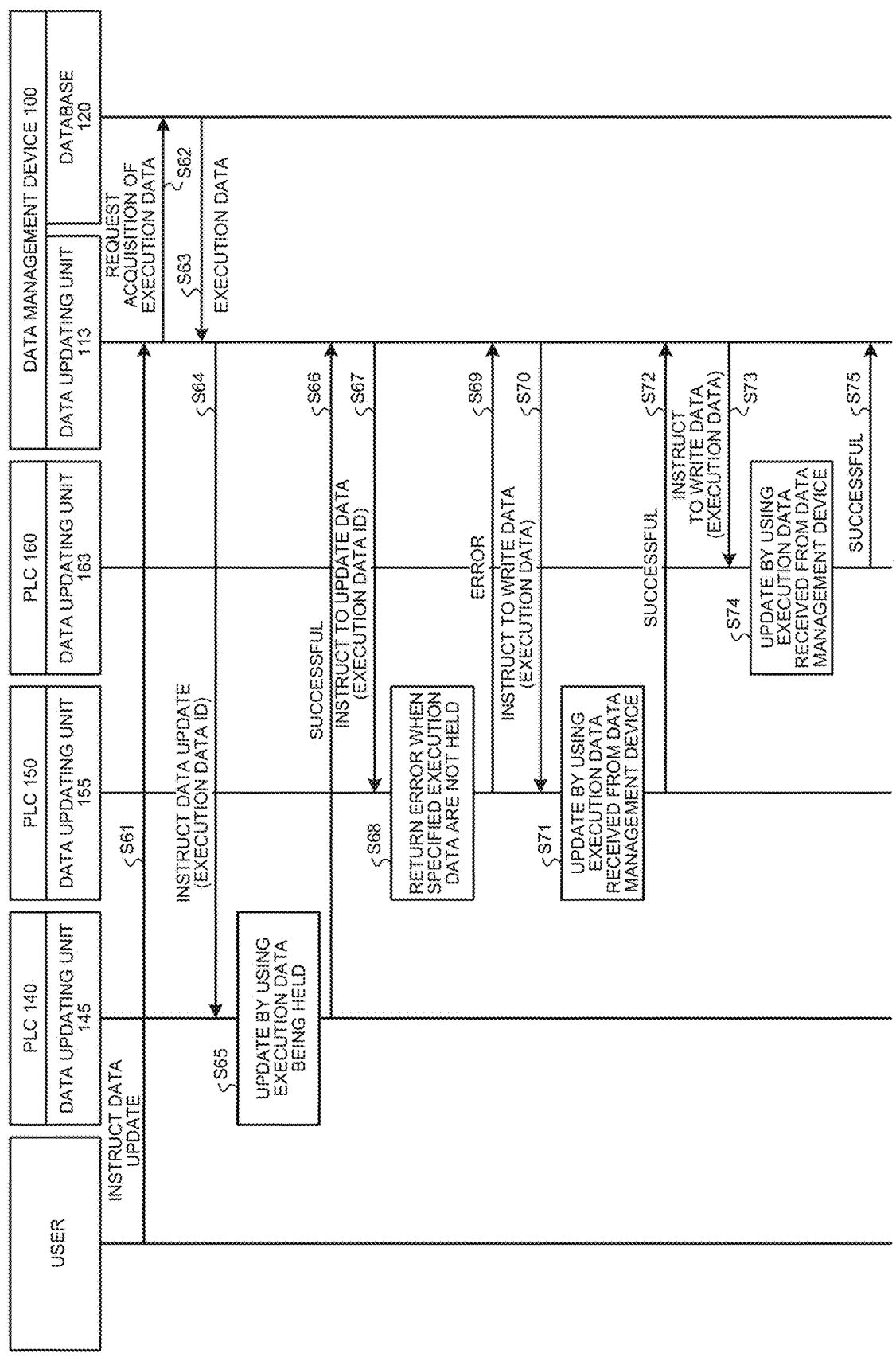
FIG. 8 is a sequence diagram illustrating an example of operation of the data management device for updating data written in each of the PLC according to the embodiment.

FIG. 8 is a sequence diagram illustrating an example of operation of the data management device 100 for updating data written in each of the PLC according to the embodiment.

The operation illustrated in FIG. 8 is started when a user has made operation for instruction to update data. For example, the user performs a predetermined operation by using the input unit 132 of the data management device 100 to cause the display 131 to display a selection screen 400 illustrated in FIG. 9 as an example. FIG. 9 is a diagram illustrating an example of an update data selection screen displayed on the display 131 of the data management device 100 according to the embodiment. The selection screen 400 includes a field 401 for displaying a list of tags attached to data, and an input field 402 for inputting an identification number of a tag. After inputting the identification number associated with the tag to be selected in the input field 402, the user operates an update execution button 403 for instruction to update data (step S61). For example, for selecting a tag B, the user inputs "2" in the input field 402 and operates the update execution button 403. Note that the operation is terminated when a cancel button 404 is operated. While the user directly operates the data management device 100 to input necessary information and the like herein for convenience of explanation, a user typically inputs necessary information and the like by using an external device such as an engineering tool connected with the data management device 100 via a network. A user may directly operate the data management device 100 to input necessary information and the like, or may operate an external device such as an engineering tool to input necessary information and the like.

Upon detecting operation for instruction to update data, the data updating unit 113 of the data management device 100 requests the database 120 execution data to which the specified tag is attached to acquire the execution data (steps S62 and S63). For example, when the database 120 has the configuration illustrated in FIG. 2 and the specified tag is "tag A", the data updating unit 113 acquires execution data associated with "tag A" from the database 120. In this case, the data updating unit 113 acquires data with the execution data ID "0" as the execution data of the PLC 140, acquires data with the execution data ID "1" as the execution data of the PLC 150, and acquires data with the execution data ID "2" as the execution data of the PLC 160.

Subsequently, the data updating unit 113 instructs the PLC 140 to update data (step S64). Because the data management device 100 recognizes that the PLC 140 includes a database, the data updating unit 113 of the data management device 100 provides information of the execution data ID for instruction to update data in step S64. The data updating unit 145 of the PLC 140 in receipt of the instruction updates data to be used in operation of controlling the device to be controlled by using the data associated with the execution data ID as informed by the data updating unit 113 of the data management device 100 among the data held in the database 141 in the PLC 140 (step S65). Specifically, the data updating unit 145 changes the setting so as to perform control operation using the data associated with the execution data ID as informed by the data updating unit 113. When the update is completed, the data updating unit 145 transmits a response indicating that the update is successful (step S66).

Subsequently, the data updating unit 113 instructs the PLC 150 to update data (step S67). Because the data management device 100 recognizes that the PLC 150 includes a database, the data updating unit 113 of the data management device 100 provides information of the execution data ID for instruction to update data in step S67. Assume, however, that the PLC 150 does not hold data associated with the execution data ID as informed by the data updating unit 113 of the data management device 100. In this case, the data updating unit 155 of the PLC 150 in receipt of the data update instruction returns an error indicating that the specified data are not held in the PLC 150 (steps S68 and S69). When an error is returned from the PLC 150 instructed to update data, the data updating unit 113 of the data management device 100 transmits execution data to the PLC 150 for instruction to write the data (step S70). Upon receiving the execution data, the data updating unit 155 of the PLC 150 updates data to be used in operation of controlling the device to be controlled by using the received execution data (step S71). When the update is completed, the data updating unit 155 transmits a response indicating that the update is successful (step S72). In this process, the data updating unit 155 may write the execution data received in step S70 into the execution data table 152 of the database 151 to update the database 151.

Subsequently, the data updating unit 113 instructs the PLC 160 to write data (step S73). Because the data management device 100 recognizes that the PLC 160 includes no database, the data updating unit 113 of the data management device 100 transmits execution data to the PLC 160 to instruct the PLC 160 to write data in step S73. Upon receiving the execution data, the data updating unit 163 of the PLC 160 updates data to be used in operation of controlling the device to be controlled by using the received execution data (step S74). When the update is completed, the data updating unit 163 transmits a response indicating that the update is successful (step S75).

As described above, in the data updating operation illustrated in FIG. 8, the data management device 100 specifies data to be update by using an execution data ID for a PLC including a database, and causes the PLC to perform the updating operation by using execution data held in the database in the PLC. This eliminates the need for transmitting execution data such as programs and set values to be actually used, which reduces the amount of transmitted data and thus shortens the time required for a transmission process. In addition, because the data management device 100 recognizes whether or not each PLC includes a database, the data management device 100 initially transmits execution data to a PLC that includes no database and instructs the PLC to update data, which prevents a communication sequence from being longer than necessary.

As described above, the data management system according to the embodiment includes: the data management device that manages data to be written into a PLC; and a plurality of PLCs that transmit updated execution data to the data management device each time execution data, which are data to be used in operation of controlling a device to be controlled, are updated. This enables the data management device to collectively manage the data written in each of the plurality of PLC included in one system. In addition, when a PLC includes a database, execution data to be transmitted to the data management device are registered in the database. As a result, for restoring execution data to be used by PLCs to the execution data at a previous time point, the data management device does not need to transmit the execution data to a PLC including a database, which shortens the time required for update operation.

The configurations presented in the embodiment above are examples of the present invention, and can be combined with other known technologies or can be partly omitted or modified without departing from the scope of the present invention.

REFERENCE SIGNS LIST 1 data management system; 11, 12 network; 100 data management device; 110, 143, 153, 161 controller; 111 network configuration detector; 112 tag information managing unit; 113, 145, 155, 163 data updating unit; 114 data acquiring unit; 120, 141, 151 database; 121 network configuration information table; 122 PLC information table; 123, 142, 152 execution data table; 124 tag information table; 140, 150, 160 PLC; 144, 154, 162 data writing unit; 146, 156 data transmitting unit; 147, 157, 164 production serial number; 165 data holding unit; 170 data updating device.

The invention claimed is:

1. A data management system comprising:
a plurality of controllers to output control data updated by a data updating circuitry to update the control data and data related information to a network, the control data being data necessary for controlling a circuit to be controlled, the data related information being information related to the updated control data and including at least date-and-time information being information on a date and time when the control data are updated;
a data management circuitry connected with the plurality of controllers via the network, and including a management circuitry storage to acquire the control data and the data related information output from each of the controllers, and accumulate the control data and the data related information in association with each other; and
a user operation receiver to receive user operation for specifying update history identification information that is information for identifying history of updating the control data, wherein
for the controllers that do not include a controller storage to store the data related information and the control data updated by the data updating circuitry, the data management circuitry updates the control data to be used by the controller that do not include the controller storage in controlling the circuitry to be controlled on the basis of the update history identification information specified by the user operation receiver and the control data stored in the management circuitry storage.

2. The data management system according to claim 1, wherein
when the control data are updated by the data updating circuitry, the controllers each output controller information in addition to the control data and the data related information, the controller information being information relating to the controllers, and
the data management circuitry acquires and holds the control data, the data related information, and the controller information output from each of the controllers.

3. The data management system according to claim 1, wherein
the data management circuitry includes a network configuration detector to acquire network configuration information by detecting the controllers connected with the network, the network configuration information being information on a configuration of the network.

4. The data management system according to claim 1, wherein
the data related information includes the date-and-time information and data identification information, the data identification information being information for identifying the control data updated by the data updating device.

5. The data management system according to claim 1, wherein
the data management circuitry includes a data acquiring circuitry to transmit a data output request requesting the controllers to output the control data, and
upon receiving the data output request, the controllers each output the control data.

6. The data management system according to claim 2, wherein
the controller information includes:
controller identification information that is information for identifying the controller; and
storage presence/absence information that is information on whether or not the controller includes a controller storage to store the data related information, and the control data updated by the data updating circuitry, wherein
for the controllers that do not include a controller storage to store the data related information and the control data updated by the data updating circuitry, the data management circuitry updates the control data to be used by the controller that do not include the controller storage in controlling the device to be controlled on the basis of the update history identification information specified by the user operation receiver and the control data stored in the management circuitry storage.

7. The data management system according to claim 6, wherein
for a controller including the controller storage, the data management circuitry updates the control data to be used by the controller in controlling a circuit to be controlled on the basis of the update history identification information specified by the user operation receiver and the control data stored in the controller storage included in the controller.

8. The data management system according to claim 7, wherein
the data management circuitry includes:
a tag input receiver to receive user operation for inputting a tag to be attached to the control data associated with a specific date and time; and
a tag information managing circuitry to generate tag information including the tag input with the tag input receiver, the controller identification information of the controller connected with the network at the specific date and time associated with the tag, and identification information of the control data used by the controller in controlling the circuitry to be controlled at the specific date and time, and set the tag information as the update history identification information.

9. The data management system according to claim 1, the controller that includes the controller storage being configured to:
when control data are updated by a data updating circuitry, transmit the date-and-time information and the data related information including data identification information that is identification information of the updated control data to a data management circuitry, and store the data related information, and
upon receiving the data identification information previously transmitted to the data management circuitry from the data management circuitry, switch to operation using the control data indicated by the received data identification information.

10. The data management system according to claim 9, configured to: acquire the date-and-time information and data related information including data identification information from each controller and manage the acquired information;
upon receiving operation of specifying one of the data related information managed by the data management circuitry from a user, transmits the data identification information included in the specified data related information to each of the controllers, and instruct the controllers to perform operation using control data indicated by the transmitted data identification information.

11. The data management system according to claim 1, wherein
the data management circuitry includes the user operation receiver.

12. A data management method comprising:
outputting to a network, by each of a plurality of controllers, control data updated by a data updating circuitry to update control data that are data necessary for controlling a circuitry to be controlled, and data related information that is information on the updated control data and includes at least date-and-time information that is information on a date and time when the control data are updated; and
acquiring, by the data management circuitry, the control data and the data related information output from each of the controllers from the network, and accumulating the control data and the data related information in association with each other in a management circuitry storage;
receiving user operation for specifying update history identification information that is information for identifying history of updating the control data; and
updating, by the data management circuitry, the control data to be used in controlling a circuitry to be controlled by the controllers that do not include a control circuitry storage to store the data related information and the control data updated by the data updating circuitry on the basis of the update history identification information specified by the user operation and the control data stored in the management circuitry storage for the controllers that do not include a controller storage.

13. A computer program product comprising a non-transitory computer usable medium having a computer readable data management program causing the computer to execute:
a process of acquiring, from a network, updated control data output by each of a plurality of controllers to the network when control data that are data necessary for controlling a circuitry to be controlled are updated by a data updating circuitry, and data related information that is information relating to the updated control data and includes at least date-and-time information that is information on a date and time when the control data are updated, and accumulating the updated control data and the data related information in association with each other in a management circuitry storage;
a process of receiving user operation for specifying update history identification information that is information for identifying history of updating the control data; and
a process of updating the control data to be used in controlling the circuitry to be controlled by the controllers that do not include a controller storage to store the data related information and the control data updated by the data updating circuitry on the basis of the update history identification information specified by the user operation and the control data stored in the management circuitry storage for the controllers that do not include a controller storage.

* * * * *